United States Patent [19]
Krebs

[11] Patent Number: 5,367,784
[45] Date of Patent: Nov. 29, 1994

[54] ROLL TAPE MEASURE

[75] Inventor: Klaus Krebs, Auf der Schlicht, Germany

[73] Assignee: Hoechstmass Balzer GmbH, Sulzbach/Taunus, Germany

[21] Appl. No.: 103,991

[22] Filed: Aug. 9, 1993

[30] Foreign Application Priority Data

Aug. 8, 1992 [DE] Germany .............. 4226273

[51] Int. Cl.$^5$ .............................. G01B 3/10
[52] U.S. Cl. ........................ 33/767; 33/769; 242/381.6; 242/396.9
[58] Field of Search ........... 33/761, 767, 769, 413, 33/394; 242/84.8, 107.12, 107.15, 107.3, 107.4 R, 107.6

[56] References Cited

U.S. PATENT DOCUMENTS

| 959,750 | 5/1910 | Joseph | 242/107.3 |
|---|---|---|---|
| 978,426 | 12/1910 | Balch | 242/107.3 |
| 1,120,341 | 12/1914 | Smith | 242/107.6 |
| 1,880,705 | 10/1932 | Bitner | 33/761 |
| 2,172,043 | 9/1939 | Wolf | 33/767 |
| 3,114,515 | 12/1963 | Kane | 33/767 |
| 3,450,367 | 6/1969 | Eogell | 33/767 |
| 3,463,416 | 8/1969 | Quenot | 242/84.8 |
| 3,606,194 | 9/1971 | Quenot | 242/84.8 |
| 4,068,383 | 1/1978 | Krebs | 33/767 |
| 4,443,944 | 4/1984 | Beesley | 33/761 |

FOREIGN PATENT DOCUMENTS

| 0152610 | 7/1953 | Australia | 33/761 |
|---|---|---|---|
| 294411 | 7/1928 | United Kingdom | 242/107.3 |
| 1336553 | 11/1973 | United Kingdom | 33/767 |

Primary Examiner—Thomas B. Will
Attorney, Agent, or Firm—Robert J. Koch

[57] ABSTRACT

The invention relates to a roll tape measure, consisting of a housing upper part and housing lower part, a perforation in the housing upper part for a release button, a spring drum with tension spring placed in the housing, whose one end is connected with the housing lower part, a back stop for the tension spring, a flexible tape measure rolled up on the spring drum and a release catch that can be actuated by the release button. The perforation for receiving release button is placed in the housing upper part eccentrically to the housing and release button is connected with a U-shaped element, into which a tongue designed in an elastically springy manner extends, which is connected on one end with the ends of both legs of U-shaped element and with release button and on whose other end the release catch is placed. The U-shaped element with elastic tongue extends over center axis of the housing.

9 Claims, 2 Drawing Sheets

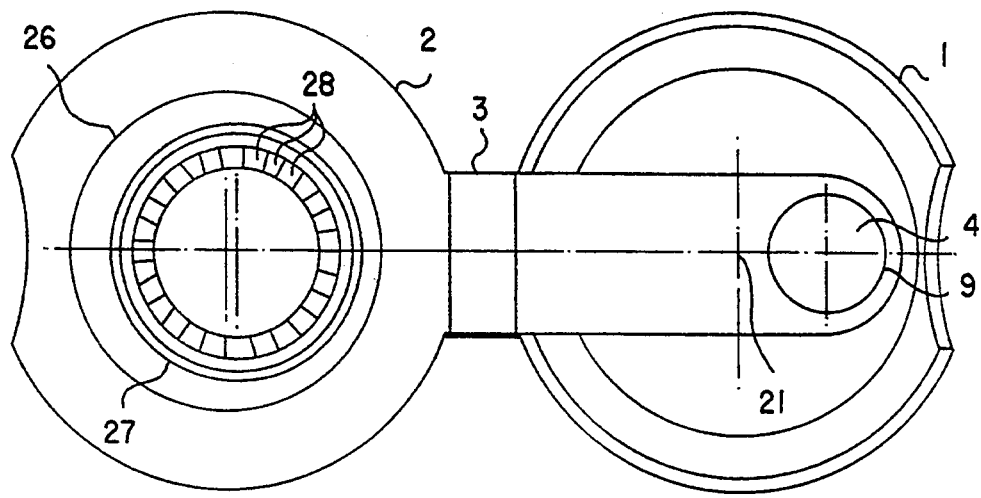
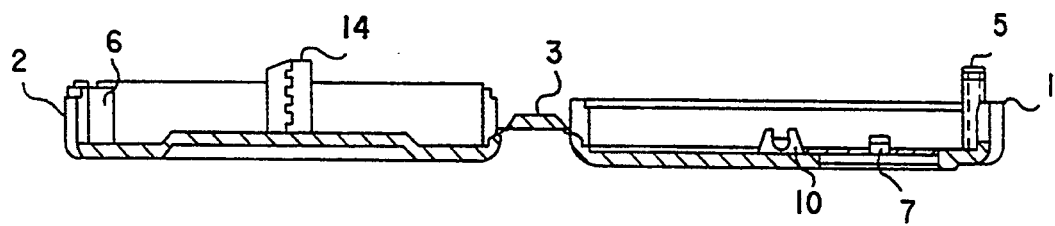
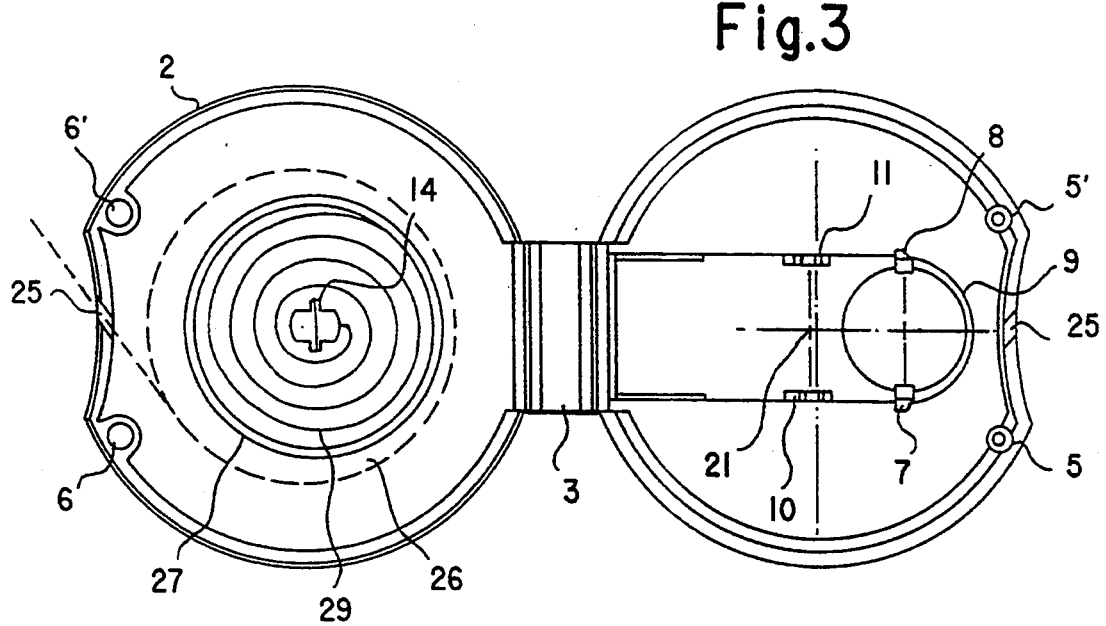

ROLL TAPE MEASURE

BACKGROUND OF THE INVENTION

1. Field of the Invention

The invention relates to a roll tape measure, consisting of a housing upper part and housing lower part, a perforation in the housing upper part for a release button, a spring drum with tension spring placed in the housing, whose end is connected with the housing lower part, a back stop for the tension spring, a flexible tape measure rolled up on the spring drum, and a release catch that can be actuated by the release button.

2. Related Technology

A roll tape measure of this type can be seen, for example, in DE utility model 69 25 460. In these structural shapes, the release button is connected or integrated with an actuating pin which, on its end in the housing, acts on a release element with a pawl. In this case, the release button must exhibit a smoothly and cleanly finished surface, so that it is guided freely movable in the axis in its lengthwise direction. To achieve this, the release button is designed integral with its end-side stop device as a mushroom-shaped control element. But the release button projects in this case from the housing surface, so that malfunctions may still occur.

A second roll tape measure of this type can be seen in DE-PS 25 45 203, in which both the housing upper part and the housing lower part exhibits surface parts which are cut out from the housing surfaces and connected by remaining crosspieces with the respective housing part. The surface parts are connected with one another by a pin centrally placed in the housing axis, so that the restoring forces of the crosspieces act in opposite directions. The centrally placed surface part cut out in the housing upper part is designed as a release button, while the surface cut out in the housing lower parts acts as a release catch, which is covered toward the outside by a plate. Relative to the above-indicated known roll tape measure, the release button no longer projects from the housing surface, but forms a relatively smooth surface. The number of individual parts used is relatively small, but it is necessary to provide both housing parts with indentations and to design the connecting crosspieces elastically. To achieve the elasticity of the connecting crosspieces, which are an integral component of the housing, a special selection of the plastics to be used is necessary, so that here only a relatively limited leeway relative to the plastic materials to be used is provided. Further, the cut-out surface parts exhibit relatively long gaps, by which dust and dirt particles can penetrate the interior of the housing.

In practice, it has further been shown that a user of such a roll tape measure does not immediately recognize the central arrangement of the release button as such and incorrectly considers the latter to be the axis of the system.

SUMMARY OF THE INVENTION

An object of the invention is to avoid the above-mentioned drawbacks and to provide a roll tape measure, which may consist of a sturdy plastic of the most varied type, which may exhibit only minimal indentations for the release button in the housing surface, so that the penetration of dust and dirt particles is considerably reduced, and the push-button for the housing may lie outside the housing center.

One solution, according to the invention, comprises the fact that the perforation for receiving the release button in the housing upper part may be placed eccentrically to the housing and the release button may be connected with a U-shaped element, into which a tongue extends, which tongue may be designed in an elastically springy manner and which may be connected on one end with the ends of both legs of the U-shaped element and with the release button, and on whose other end the release catch may be placed. In this case, the release button with its elastically springy tongue and the U-shaped element, into which the tongue projects, form a subassembly. This can be produced from a high-grade plastic, since a pretension exists between the U-shaped element and the elastically springy tongue, while for the housing, a material of higher strength and without special elastic properties can be used.

According to an embodiment of the invention, the U-shaped element with the elastic tongue extends over the center axis of the housing. As a result, the possibility arises to place the release button eccentrically to the housing and to use a pin as a block for the elastic tongue. This pin is placed in the interior of the housing lower part and in the housing center, which receives the end of the return spring and simultaneously, in the closed state of the housing, acts on the axis of tilt of the tongue and thus in an advantageous way forms a block.

According to this embodiment of the invention, the U-shaped element exhibits support studs on both outsides of its legs, whose axis is guided perpendicularly through the center axis of the housing, which simultaneously forms the axis of rotation of the tongue with its release button, and the support studs respectively are received by a bearing on the inside of the housing upper part. In this case, each bearing consists of a bearing block, whose base is shaped for receiving the support studs.

According to a further development of the invention, the tongue connected with the release button forms an angle to the plane of the U-shaped element, so that the release catch on the end of the tongue exhibits a pretension relative to the back stop of the tension spring.

The housing upper part may be connected with the housing lower part by an integrated strap. Thus, both the storage and the assembly are considerably simplified. Two plunger pins may be placed on the edge of a housing part, which is opposite the strap, and two bores for receiving the plunger pins and closure of the housing parts may be placed on the edge of the other housing part. Thus, the housing halves can be folded against each other in a simple way and connected with one another by the plunger pins, without screw connections being necessary.

On the inside of the housing upper part, stops, which are used to limit the height of lift of the release button into the interior of the housing, may be placed on the edge of the bore for receiving the release button. The stops are integrated with the housing in an advantageous way.

In the same way, a stop may be placed on the inside of the surface of the release button on its outside edge in the tongue-release button longitudinal axis and integrated with the latter, which limits the height of lift of the release button toward the outside.

BRIEF DESCRIPTION OF THE DRAWINGS

The invention is described in more detail based on the drawings.

FIG. 1 shows a top view of the outsides of the lower and upper housing.

FIG. 2 shows a longitudinal section according to FIG. 1.

FIG. 3 shows a top view of the insides of the lower and upper housing.

DESCRIPTION OF THE PREFERRED EMBODIMENT

Figure 5:
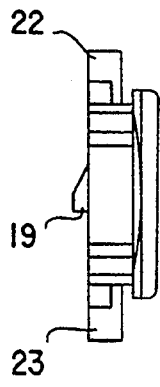
FIG. 5 shows a view of the element according to FIG. 4 from the front.

FIG. 1 shows a top view of the outsides of housing upper part 1 and housing lower part 2 in unfolded state. In this case, housing upper part 1 is connected with housing lower part 2 by an integrated strap 3, which in the closed state of the housing parts completely closes the area in the housing parts set aside for the strap. Release button 4 is in a recess of housing 1 and forms only a narrow gap with the latter.

FIG. 2 shows housing parts 1 and 2 in longitudinal section. To fasten both housing parts 1 and 2, fastening pins 5, 5' are present in housing upper part 1 which engage in corresponding bores 6, 6' in housing lower part 2 and tightly seal both housing parts with one another, so that no screw connections are necessary. A pin 14, whose function is described based on FIG. 3, is located in the bottom of housing lower part 2 in the center.

In housing upper part 1, stops 7 and 8 are provided on bore edge 9 as lower stops of release button 4, which extend over bore edge 9 at a defined distance, which determines the lift of the release button. The upper limit of lift of release button 4 may also be brought about by a stop, which may be attached to release button 4 and configured to abut a recess on the inside of housing upper part 1.

Bearing blocks 10 and 11 receive support studs 22 and 23 of the element described based on FIGS. 4 to 8. Pin 14 exhibits a longitudinal gap, in which the end of the tension spring, not represented in more detail, is clamped. The other end of the tension spring is connected with a spring drum rotatable around pin 14.

As can be seen from FIG. 2, pin 14 is longer than the height of a housing half, so that in the assembled state, it projects into upper housing upper part 1, abuts tongue 15 and is used as a block for the latter.

FIGS. 4 to 8 show release element 20 in enlarged representation. In this case, release button 4 is connected with a U-shaped element 16, into which tongue 15, designed in an elastically springy manner, extends, which is connected on one end with the ends of both legs 17, 18 of U-shaped element 16 and with release button 4, and on whose other end is release catch 19. U-shaped element 16 with elastic tongue 15 extends over center axis 21 of the housing. Support studs 22 and 23, whose common axis 24 is guided perpendicularly through center axis 21 of the housing, which simultaneously forms the axis of rotation of tongue 15 with its release button 4, are on U-shaped element 16, on both outsides of its legs 17 and 18. Support studs 22, 23 are respectively received by a bearing 10 or 11 on the inside of housing upper part 1.

Tongue 15 connected with release button 4 forms an angle to the plane of U-shaped element 16 with legs 17 an 18, so that release catch 19 on the end of tongue 15 exhibits a pretension relative to the back stop of the tension spring, not represented in more detail. As a result, release catch 19 grips correspondingly designed wedge-shaped counterelements 28, which are on the cover of the spring drum 27, not represented in more detail. A flat spiral spring 29, whose end is connected with pin 14 and whose other end is connected with the spring drum, is wound up in the spring drum. Measuring tape 26 is wound on the outside wall of the spring drum and guided toward the outside by a slot 25 in housings 1, 2.

Figure 4:
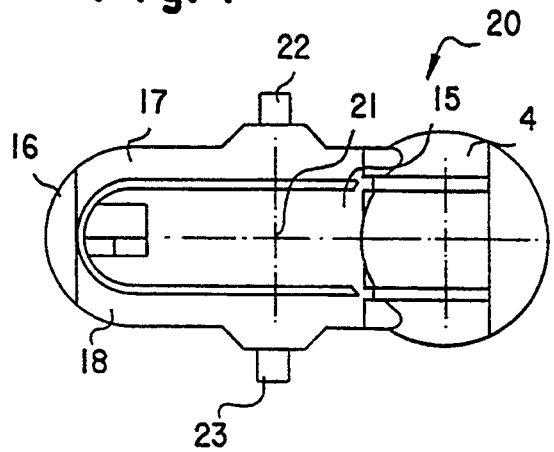
FIG. 4 shows an enlarged representation of the release button with elastic tongue and U-shaped element viewed from the bottom.
Figure 6:
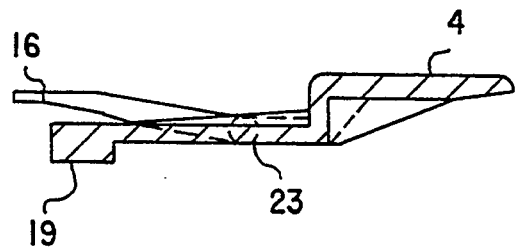
FIG. 6 shows a longitudinal section of the element according to FIG. 4.
Figure 7:
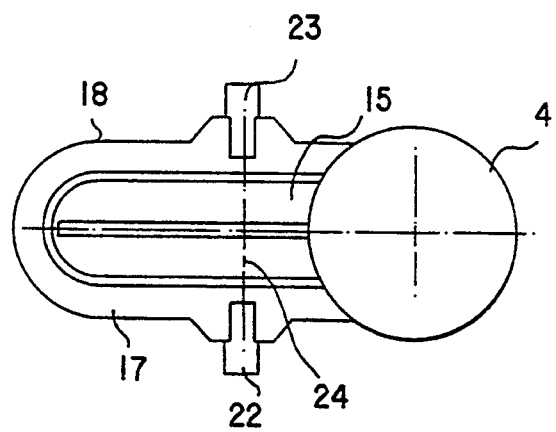
FIG. 7 shows the element according to FIG. 4 in a view from the top.
Figure 8:
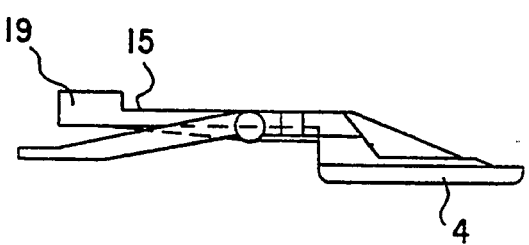
FIG. 8 shows a side view of the element according to FIG. 4.

As can be seen in FIGS. 4, 6 and 8, the connecting line of support studs 22–23 forms the bottom line for the deviation of tongue 15. In assembled state of the housing, pin 14 abuts the center point of this bottom line, and acts there as a block if release button 4 is actuated.

The release element is suitably produced from a high-grade plastic, which can also have a color different from the plastic for the housing.

The entire roll tape measure consists of a minimum of individual parts, and for each plastic part, the plastic can be used which is suitable only for this part appropriate with respect to its stress or other requirements.

I claim:

1. A roll tape measure comprising:
   a housing upper part having an eccentrically placed perforation adapted to receive a release button;
   a housing lower part adapted to mate with said housing upper part;
   a spring drum connected to said housing lower part;
   a flexible tape measure rolled up on said spring drum;
   and a release element adapted to be placed between said housing upper part and said housing lower part, said release element comprising:
   a release button,
   a U-shaped element connected to said release button and having a first leg and a second leg,
   a tongue-shaped element extending between said first and second legs of said U-shaped element and attached at a first end to said first and second legs and to said release button,
   and a release catch attached to a second end of said tongue-shaped element adapted to be in contact with said spring drum.

2. A roll tape measure according to claim 1, wherein said release element extends over a center axis of said housing upper part and said housing lower part.

3. A roll tape measure according to claim 2, further comprising support studs situated on both said first and second legs of said U-shaped element, wherein an axis of said studs is guided perpendicularly through said center axis of said housing upper part and said housing lower part, and wherein said axis of said studs simultaneously forms an axis of rotation of said tongue together with said release button.

4. A roll tape measure according to claim 3, further comprising at least one bearing located on the inside of said housing upper part and adapted for receiving one of said support studs.

5. A roll tape measure according to claim 1, wherein said tongue-shaped element forms an angle to the plane of said U-shaped element.

6. A roll tape measure according to claim 1, further comprising a pin located at the center interior of said housing lower part, and a tension spring located in the interior of said spring drum, wherein said pin is adapted to receive an end of said tension spring and wherein said pin is simultaneously adapted to contact said tongue-shaped element and act as a fulcrum for said tongue-shaped element.

7. A roll tape measure according to claim 6, further comprising an integrated and flexible connecting strap connected to both said housing upper part and said housing lower part, a fastening pin situated on the edge of one of said housing parts opposite said strap and a bore, adapted to receive said fastening pins, situated on the edge of the other said housing part.

8. A roll tape measure according to claim 1, further comprising a stop means for limiting the height of lift of said release button, wherein said stop means is attached to said housing upper part.

9. A roll tape measure according to claim 1, further comprising a stop means for limiting the height of lift of said release button, wherein said stop means is integrated on the inside of the surface of said release button on its outside edge in the tongue-release button longitudinal axis.

* * * * *